US008527893B2

(12) United States Patent
Agrawal et al.

(10) Patent No.: US 8,527,893 B2
(45) Date of Patent: Sep. 3, 2013

(54) TAXONOMY EDITOR

(75) Inventors: Sanjay Agrawal, Redmond, WA (US); Surajit Chaudhuri, Redmond, WA (US); Venkatesh Ganti, Redmond, WA (US); Yuri Siradeghyan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 12/713,190

(22) Filed: Feb. 26, 2010

(65) Prior Publication Data

US 2011/0214080 A1    Sep. 1, 2011

(51) Int. Cl.
*G06F 3/048*    (2013.01)

(52) U.S. Cl.
USPC ............................................... 715/771

(58) Field of Classification Search
USPC ............................................... 715/771
See application file for complete search history.

(56) References Cited

U.S. PATENT DOCUMENTS

| | | | |
|---|---|---|---|
| 6,442,545 B1 * | 8/2002 | Feldman et al. ............... | 1/1 |
| 7,447,677 B2 | 11/2008 | Milligan et al. | |
| 2001/0037324 A1 * | 11/2001 | Agrawal et al. ................ | 707/1 |
| 2008/0306913 A1 | 12/2008 | Newman et al. | |
| 2008/0306947 A1 | 12/2008 | Kolesnikov | |
| 2009/0037457 A1 | 2/2009 | Musgrove | |
| 2010/0251156 A1 * | 9/2010 | Cantwell ..................... | 715/771 |

OTHER PUBLICATIONS

User manual for Taxonomic editor version 3 by Royal Botanic Garden Edinburgh released date Feb. 17, 2010.*

Spangler, et al., "Interactive Methods for Taxonomy Editing and Validation", Retrieved at <<http://www.almaden.ibm.com/asr/projects/biw/publications/rj10300.pdf>> In the proceedings of the eleventh international conference on Information and knowledge management Aug. 20, 2003, pp. 46.

Some, et al., "XML Technology Planning Database: Lessons Learned", Retrieved at <<http://citeseerx.ist.psu.edu/viewdoc/download?doi=10.1.1.130.3835&rep=rep1&type=pdf>> In the proceedings of Aerospace Conference, 2005 IEEE, Nov. 24, 2004, version 2, pp. 1-17.

Spangler, et al.,"Generating and Browsing Multiple Taxonomies over a Document Collection", Retrieved at <<http://users.cs.dal.ca/~sbrooks/csci4166-6406/seminars/readings/Generating%20and%20Browsing%20Multiple%20Taxonomies%20Over%20a%20Document%20Collection.pdf>> In the proceedings of Journal of Management Information Systems,2003, vol. 19, No. 4, pp. 191-212.

(Continued)

*Primary Examiner* — William Bashore
*Assistant Examiner* — Hien Duong

(57) ABSTRACT

This patent application relates to taxonomy editing. One implementation involves a taxonomy editor configured to generate a visual representation of a taxonomy associated with a set of scientific papers. The taxonomy editor includes a properties module configured to identify properties relating to an individual node of the taxonomy and a statistics module configured to determine trends relating to the individual node. The taxonomy editor further includes a similarity module configured to evaluate keyword similarity relative to individual scientific papers associated with the individual node. The taxonomy editor also includes a suggestion module configured to utilize the properties, the trends and the keyword similarity to identify potential modifications to the taxonomy. The taxonomy editor is further configured to present at least some of the potential modifications, the properties, the trends, and the keyword similarity concurrently with the visual representation of the taxonomy.

21 Claims, 11 Drawing Sheets

(56) References Cited

OTHER PUBLICATIONS

Mack, et al., "Knowledge Portals and the Emerging Digital Knowledge Workplace", Retrieved at <<http://citeseerx.ist.psu.edu/viewdoc/download?doi=10.1.1.85.8208&rep=rep1&type=pdf>> In the proceedings of IBM Systems Journal, 2001, vol. 40, No. 4, pp. 925-955.

Lima, et al., "The BCXML: Supporting Ecommerce and Knowledge Management in the Construction Industry", Retrieved at <<http://citeseerx.ist.psu.edu/viewdoc/download?doi=10.1.1.131.1922&rep=rep1&type=pdf>> In the proceedings of ITcon vol. 8, Oct. 2003, pp. 293-308.

* cited by examiner

TAXONOMY EDITOR

BACKGROUND

Scientific/technical papers function as an effective tool for disseminating cutting edge knowledge in a particular scientific discipline. These scientific papers are often published in conjunction with a conference in which the authors can present their findings to their peers. Beyond the conference, the scientific papers are often gathered in databases for access by various users. For instance, the Institute of Electrical and Electronics Engineers (IEEE) may maintain a database of scientific papers presented at IEEE sponsored conferences. Individual databases can be quite large and difficult to manage. Accordingly, some databases are ordered according to a taxonomy. However, the taxonomy tends to be formulated at a specific point in time and to be rigid as to its configuration/organization. Thus, as the database evolves over time, the taxonomy tends to become ever more inefficient and/or obsolete. Typically, users access the papers through the taxonomy. Thus, users looking for scientific papers in these databases tend to have unsatisfying user-experiences because of the difficulty in locating germane papers. Further, this contributes to the scientific papers being under-accessed and hence under-utilized.

SUMMARY

This patent application relates to taxonomy editing. One implementation involves a taxonomy editor configured to generate a visual representation of a taxonomy associated with a set of scientific papers. The taxonomy editor includes a properties module configured to identify properties relating to an individual node of the taxonomy and a statistics module configured to determine trends relating to the individual node. The taxonomy editor further includes a similarity module configured to evaluate keyword similarity relative to individual scientific papers associated with the individual node. The taxonomy editor also includes a suggestion module configured to utilize the properties, the trends and the keyword similarity to identify potential modifications to the taxonomy. The taxonomy editor is further configured to present at least some of the potential modifications, the properties, the trends, and the keyword similarity concurrently with the visual representation of the taxonomy.

The above listed example is intended to provide a quick reference to aid the reader and is not intended to define the scope of the concepts described and/or claimed herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application pertains to organizing a set of scientific papers utilizing a taxonomy. In some cases, the taxonomy can be thought of as a hierarchy of nodes (i.e. categories where each node corresponds to a category in the underlying taxonomy). The set of scientific papers are attached to and/or associated with, leaf nodes of the taxonomy. Stated another way, individual papers can be associated with one or more nodes of the taxonomy. For example, one subset of the papers can be associated with a first node while a second subset can be associated with a second node. Further, each paper can be associated with a set of keywords that help identify the relevant subject area of the paper.

The present application further discusses a taxonomy editor that can provide various features related to the taxonomy. For instance, the taxonomy editor can allow a user to browse and navigate the taxonomy. In some cases, the taxonomy editor can provide a tree-based graphical interface of the taxonomy for the user. The user may readily visualize the organization of the taxonomy from the tree-based graphical interface. Further, the user can readily navigate through levels of the taxonomy via the tree-based graphical interface. In some implementations, the taxonomy editor can generate visual statistics that accompany the tree-based graphical interface. These visual statistics can further aid the user in navigating the taxonomy and/or in modifying the taxonomy. Some of these implementations can automatically suggest modifications to the taxonomy that can enhance organization and hence usability of the taxonomy.

Figure 1:
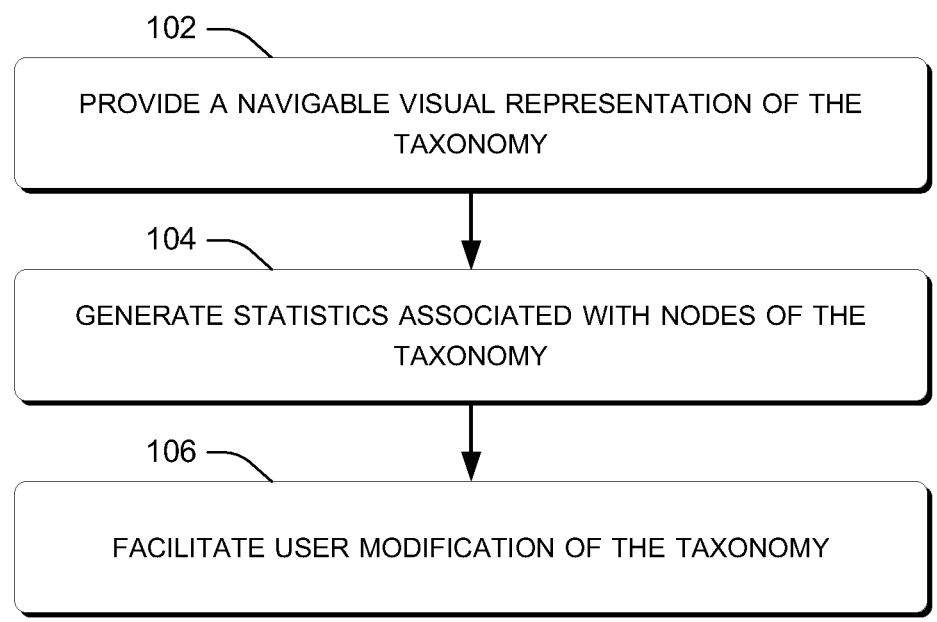
FIG. 1 shows an example of a taxonomy editing method in accordance with some implementations of the present concepts.

FIG. 1 offers an introductory technique or method 100 for editing a taxonomy associated with a set of scientific papers. For instance, the set of scientific papers may be contained in a database maintained by a scientific organization. Block 102 can provide a navigable visual representation of the taxonomy. One example of a navigable visual representation of the taxonomy is a tree-based graphical representation. The user can browse and/or navigate the tree-based graphical representation to locate scientific papers contained in the database and/or to see how the scientific papers are organized relative to the taxonomy.

Block 104 can generate statistics associated with nodes of the taxonomy. In some cases, the generated statistics can be displayed as trend lines, charts, and/or in other graphical manners for the user. These statistics can allow the user to easily identify parts of the taxonomy that may benefit from modification. For example, the user may examine the generated statistics to identify an area or portion (e.g., a node) of the taxonomy that might benefit from modification. Briefly, modification can include operations like split (for refinement) or collapse (for simplification). Modification is explained in more detail below by way of example relative to FIGS. 2-8.

Some implementations can simply display the statistics that can aid the user in identifying potential modifications. Other implementations can display the statistics and/or can automatically detect or identify the areas or portions that may benefit from modification and display these portions for the user. For instance, portions that might benefit from modification may be visually demarcated in some manner for the user. Further, some of these implementations may determine one or more potential modifications for the identified portions and present or suggest the potential modification(s) to the user.

Block 106 facilitates user modification of the taxonomy. For instance, where potential modifications are presented to the user, the user can select individual potential modifications to be applied to the taxonomy. The selected modification(s) can then be automatically applied to the taxonomy. An updated or modified taxonomy that reflects the modifications can then be provided to the user. The process can be repeated until the user is satisfied with the taxonomy.

In summary, an existing taxonomy can be presented to the user in a graphical manner that can allow integrated search and navigation. The presentation can also include an accompanying rich set of statistics relating to the taxonomy. For instance the statistics can include trend lines and charts, among others, about individual nodes of the taxonomy. Further, the user can interactively modify the taxonomy. For example, the modification can allow the user to collapse, split, or delete a node, create nodes, move papers between nodes and assign papers to nodes. These operations can allow users to easily create a new and potentially more desirable taxonomy. Automatic suggestions can be offered to the user to aid the user in creating the new taxonomy.

Example Taxonomy Editor Screenshots

FIGS. 2-8 show examples of screenshots of graphical user interfaces that can be generated in relation to taxonomy editing. Assume for purposes of explanation that the screenshots are generated relative to a database of scientific papers.

Figure 2:
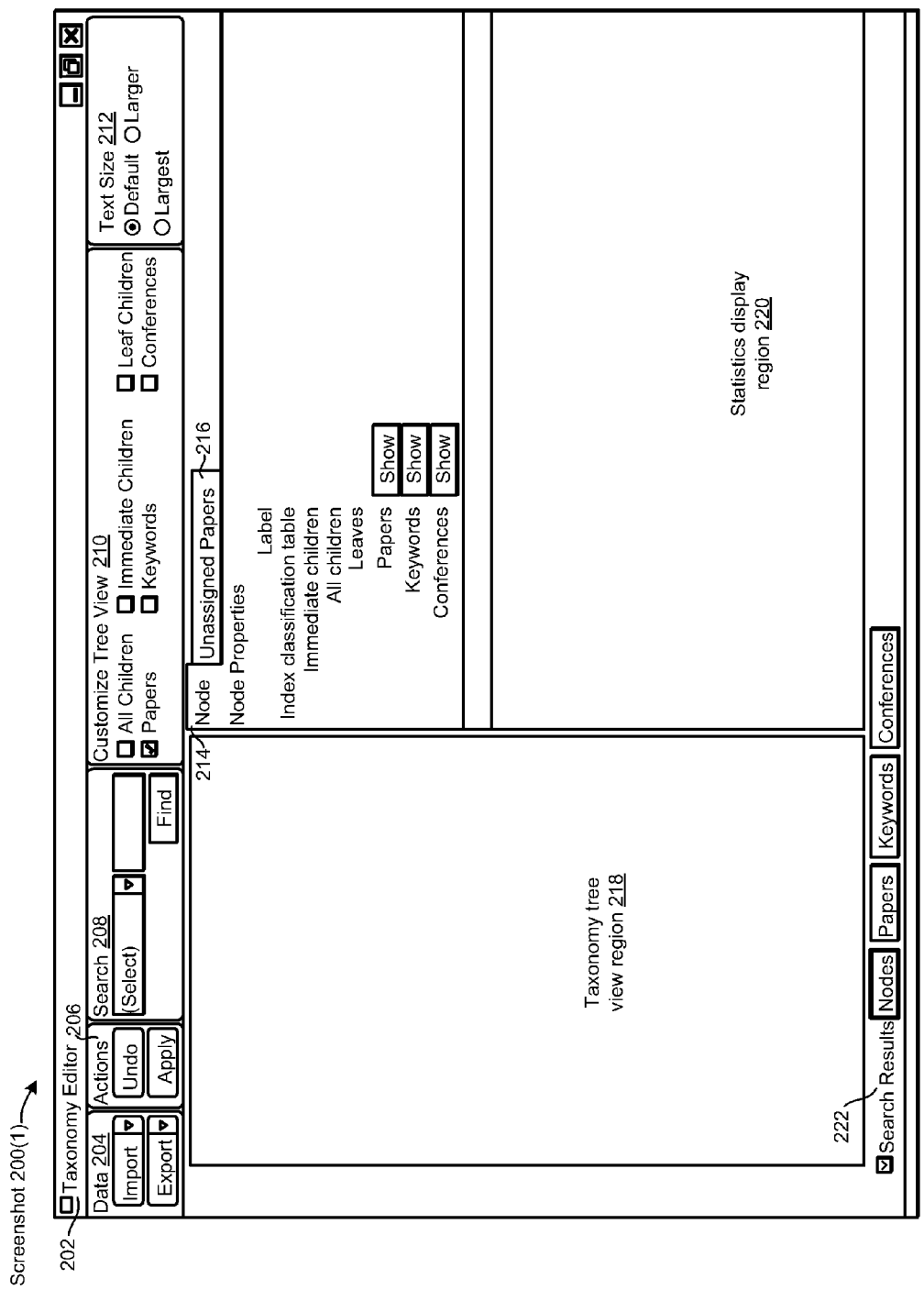
FIGS. 2-8 show screenshots that relate to taxonomy editing in accordance with some implementations of the present concepts.

FIG. 2 shows a screenshot 200(1) generated by a taxonomy editor 202. Screenshot 200(1) introduces multiple functionalities relating to taxonomy organization and modification; several of these functionalities are discussed with specificity below. In this example, screenshot 200(1) includes a data menu 204, an action menu 206, a search menu 208, a customize tree view menu 210, a text size menu 212, a node menu 214, an unassigned papers menu 216, a taxonomy tree view region 218, a statistics display region 220, and a search results menu 222.

Data menu 204 can allow the user to input and export taxonomy and paper data. For instance, the user can click "import" to load an existing taxonomy and data files (i.e., papers) together or separately. One configuration offers several options as a drop down menu from the data menu 204. For example, the drop down options can allow the user to select to load just the taxonomy. Another option can allow the user to download the taxonomy with the paper data including an existing paper-to-taxonomy mapping (i.e. nodes in the taxonomy that contain the specific paper). Another option can allow paper data to be loaded from selected files along with the paper-to-taxonomy mapping. A further option is similar to that mentioned above, but obtains the papers and mapping from a folder rather than from files.

Action menu 206 offers "undo" and "apply" options. For instance, a user can undo the last change to the taxonomy or apply the current taxonomy to selected files or folders. Search menu 208 allows the user to search over taxonomy or data associated with the taxonomy.

Customize tree view menu 210 can allow the user to specify the manner in which the taxonomy tree is displayed. Text size menu 212 can allow the user to customize text size on the displayed taxonomy tree. Node menu 214 can illustrate properties of a selected node of the taxonomy tree. Unassigned papers menu 216 can show papers that currently are not assigned to any node in the taxonomy.

Taxonomy tree view region 218 can display the tree view of all or a portion of the taxonomy. Statistics display region 220 can show statistics associated with a selected node or portion (i.e., sub-tree) of the taxonomy.

Looking again at the search menu 208, the user can enter search criteria, such as search parameters and/or search conditions, into the search menu to define a search. For instance, the user can enter a search parameter into search menu 208 relating to all or a portion of the taxonomy. Search menu 208 may allow the user to specify conditions associated with the search parameter. For instance, a drop down menu may be provided with various search conditions. Examples of such search conditions can include "node labels", "keywords", "conference name", "paper count greater than", "paper count less than", etc. The generated search results can be displayed on the search results menu 222. An example of such as process is illustrated below relative to FIG. 4.

Before continuing with the discussion, an example of XML code that can be utilized by the taxonomy editor 202 for receiving a taxonomy is detailed below. A taxonomy can be thought of as a hierarchy of categories (i.e. nodes) where index classification elements uniquely identify a category (i.e. node) of the taxonomy.

```
Sample:
<?xml version="1.0" encoding="utf-8"
<categories>
    <category label="Root">
        <indexclassification>A</indexclassification>
            <category label="General">
                <indexclassification>A0</indexclassification>
                <category label="A00">
                    <indexclassification>A00</indexclassification>
                    <category label="A000">
            <indexclassification>A000</indexclassification>
                                    <category
label="A0000">
            <indexclassification>A0000</indexclassification>
                    </category>
                </category>
            </category>
        </category>
    </category>
    <category label="B">
        <indexclassification>B</indexclassification>
    </category>
</categories>
```

An example of code that can be utilized by the taxonomy editor 202 to receive paper data is described below. Each paper (i.e. publication) has an index classification set (i.e., "indexclassificationset") element that in turn contains a set of index classification elements (i.e., "indexclassification elements"). Since each "indexclassification" corresponds to a unique category or node in the taxonomy, the "indexclassificationset" for a paper identifies all categories (i.e. nodes) in the taxonomy that contain that paper. If there are no such categories for a paper, the paper is considered as unassigned. Each paper includes a set of keywords that help identify the relevant subject area of the paper. For example, this set of keywords may be selected from a predefined list of keywords when a paper is selected for publication and is entered into the database. Another example includes the case where the list of keywords are added as tags for the paper during or after publication of the paper.

```
Sample
<?xml version='1.0' encoding='UTF-8'?>
<!DOCTYPE publication SYSTEM 'ieee_idams_exchange.dtd'>
<publication>
    <publication>
        <title><![CDATA[IEEE Antennas and Propagation Society International
Symposium. (C]]></title>
        <volume>
            <volumeinfo>
                <year>2000</year>
            </volumeinfo>
            <article>
            <title><![CDATA[An adaptive wavelet-based approach for non-
destructive evaluation applications]]></title>
                <articleinfo>
                    <amsid>874583</amsid>
                    <keywordset keywordtype="Inspec">
                        <keyword>
                            <keywordterm><![CDATA[electromagnetic wave
scattering]]></keywordterm>
                        </keyword>
                        <keyword>
                            <keywordterm><![CDATA[nondestructive
testing]]></keywordterm>
                        </keyword>
                    </keywordset>
                    <indexclassificationset>
                        <indexclassificattion>A0000</indexclassificaation>
                    </indexclassificationset>
                </articleinfo>
            </article>
        </volume>
    </publication>
```

The taxonomy editor can export a taxonomy and associated data utilizing the following XML code.

```
Sample
<?xml version="1.0" encoding="utf-8"?>
<categorieswithpublications>
    <categories>
        <category label ="Root">
        </category>
    </categories>
    <publications>
        <publication>
        </publication>
    </publications>
</categorieswithpublications>
```

Figure 3:
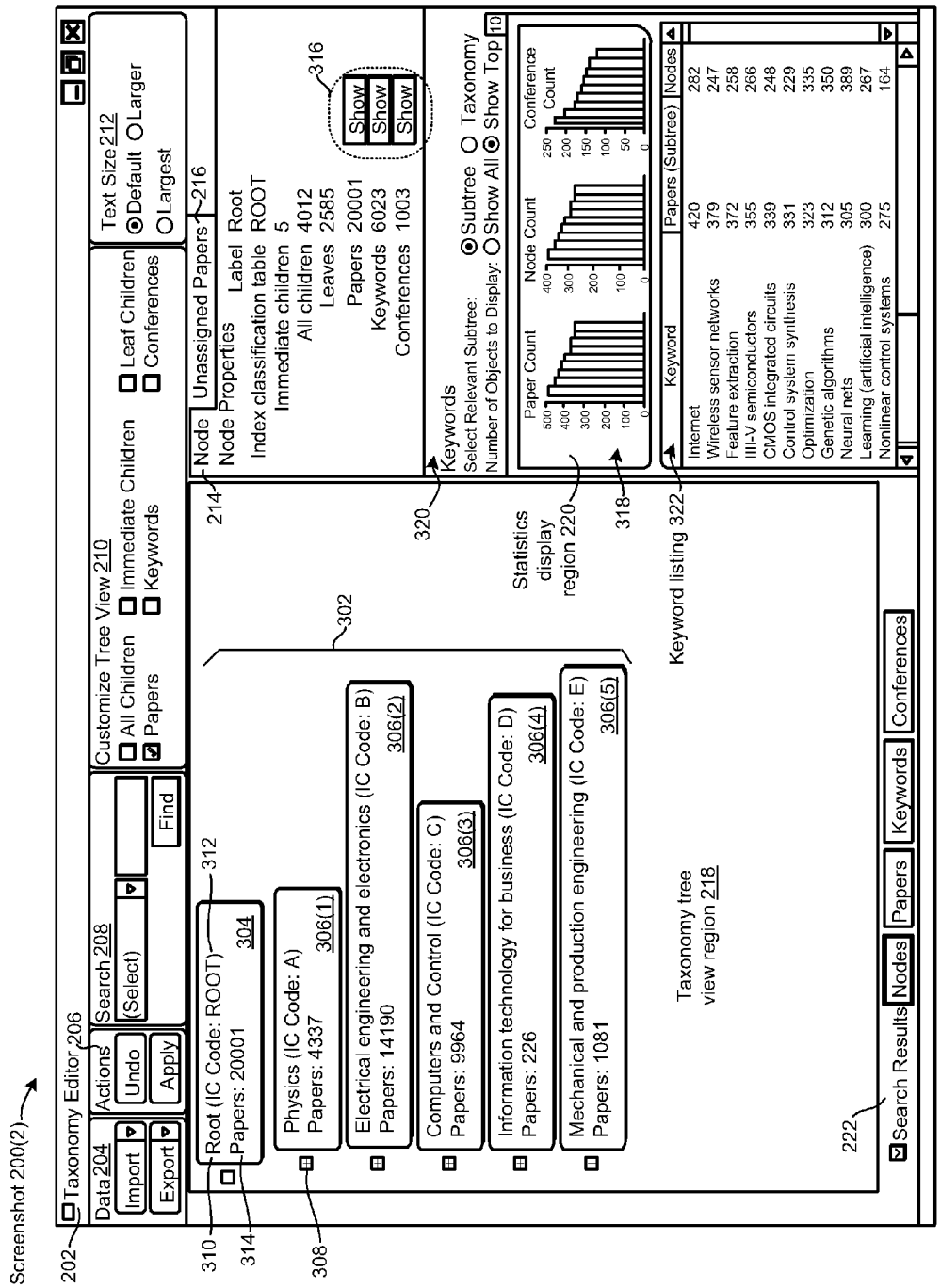

FIG. 3 shows a subsequent screenshot 200(2) with a taxonomy tree 302 shown generally in taxonomy tree view region 218. In this case, the taxonomy tree includes a root node 304 and five leaf nodes 306(1)-306(5). (Of course, the taxonomy including six nodes is simply an example and other trees can have more or less nodes). Within taxonomy tree 302, the user can click on an individual node's status sign (not all of which are designated with specificity) to navigate the taxonomy. For instance, the user can navigate the physics node 306(1) by selecting status sign 308. Thus, if the user wants to expand an individual node to see any child nodes, the user can click the status sign to "+" or the user can collapse the node by clicking "−".

Individual nodes 304 and 306(1)-306(5) can be associated with one or more properties. Briefly, these properties can include a label, an index classification code, and a number of papers associated with the node. Examples of other properties are discussed below. Labels are generally human-readable to provide useful information to the user. Index classification codes can function as an identifier that is unique to an individual node for reference purposes.

In this case, the label and index classification codes are shown with their respective nodes in the taxonomy tree view region 218. For instance, root node 304 is labeled as the "Root" at 310 with an index classification of "ROOT" at 312 and the number of associated papers is listed as 20001 at 314. The user can select an individual node to see additional properties of the node. For instance, the user can select, such as by left mouse clicking, an individual node to have the node's properties shown on the node menu 214 and to have statistics shown on the statistics display region 220. The user can view operations of a node 304 or 306(1)-306(5), such as by right mouse clicking on the node.

In this particular case, for purposes of explanation, assume that the user left clicked on the root node 304. A more detailed view of the root node's properties are responsively displayed in the node menu 214 and its statistics are displayed in the statistics display region 220. The root node's properties as indicated in node menu 214 show that this node is labeled as the "Root" and indexed as "ROOT". (These two entries are also shown in the taxonomy tree view region 218 at 310 and 312, respectively). Further, the root is indicated as having 5 immediate children nodes (i.e., nodes 306(1)-306(5)) and a total number of children nodes of 4012. The root node includes 20001 papers (also shown at 314), 6023 keywords, and 1003 conferences.

Further, this configuration can allow the user to specify the statistics in the form of charts and/or lists to be presented relative to the selected node. In this case, as indicated at 316 the user has selected the number of papers in the root node, the number of keywords in the root node and the number of conferences represented by the roof node for graphical illustration at 318 in the statistics display region at 220. Specifically, these statistics are shown as "Paper Count", "Node Count" and "Conference Count" at 318.

When viewing by keyword, the "Paper Count" chart shown at 318 can relate to keywords in the node. The user can specify whether the keywords are ordered by decreasing number of papers in a sub-tree or the entire taxonomy. The "Node Count" chart (and/or "Conference Count" chart) are similar. These charts can relate to the number of leaf nodes or number of conferences that contain the keyword, respectively.

In this case, further assume that the user has requested to see the top ten keywords of an individual sub-tree of the root node as indicated at 320. A responsive keyword listing is shown at 322 that includes the top ten keywords, along with the respective number of papers and nodes in which they occur. This configuration can allow the user to search the keyword listing 322 for occurrences of the keyword in papers, node or conferences, among others. For instance, the user can right click on the listing and enter terms in a responsively generated search window. Trend lines for keywords can be generated for the user based upon papers or conferences per year.

As mentioned above, papers can be attached to, or associated with, individual nodes of the taxonomy. Further, similar to the relationship of a node and its properties described above, papers can be associated with various properties. Examples of such properties can include a unique identifier, a conference at which the paper was presented, journal in which the paper appears, year of publication, a set of keywords, and/or a set of index classification codes, among others. In some cases the keywords are predefined according to a standard, such as the INSPEC standard. The index classification codes can correspond to the node to which the paper is attached.

In light of the information provided to the user by screenshot 200(2), the user may decide to modify the taxonomy. (Examples of modifications are introduced briefly here and explained and illustrated with more detail relative to FIGS. 6-8). For instance, in some configurations, the user can select an individual node 304 and 306(1)-306(5) for modification, such as by right clicking on the node in the taxonomy tree region 218. The user can modify the node in various ways. For instance, the user can change the label of the node. For example, the user may want to change the label to a more representative or widely used term.

In another case, the user may modify the taxonomy by collapsing the sub-tree at the node. Papers in the leaf nodes in the sub-tree are responsively added to the node, and the sub-tree can be deleted. Alternatively, for a non-leaf node, the user can add a child node. Similarly, the user can delete the node and the sub-tree from the taxonomy. The associated papers can then be unassigned from the deleted nodes. A further functionality is the split functionality. The split functionality can be utilized to add child nodes to the selected node. The papers associated with the existing parent node can then be split between the parent node and the child node. The user can also remove papers from leaf nodes or move papers from the selected node to another node.

Figure 4:
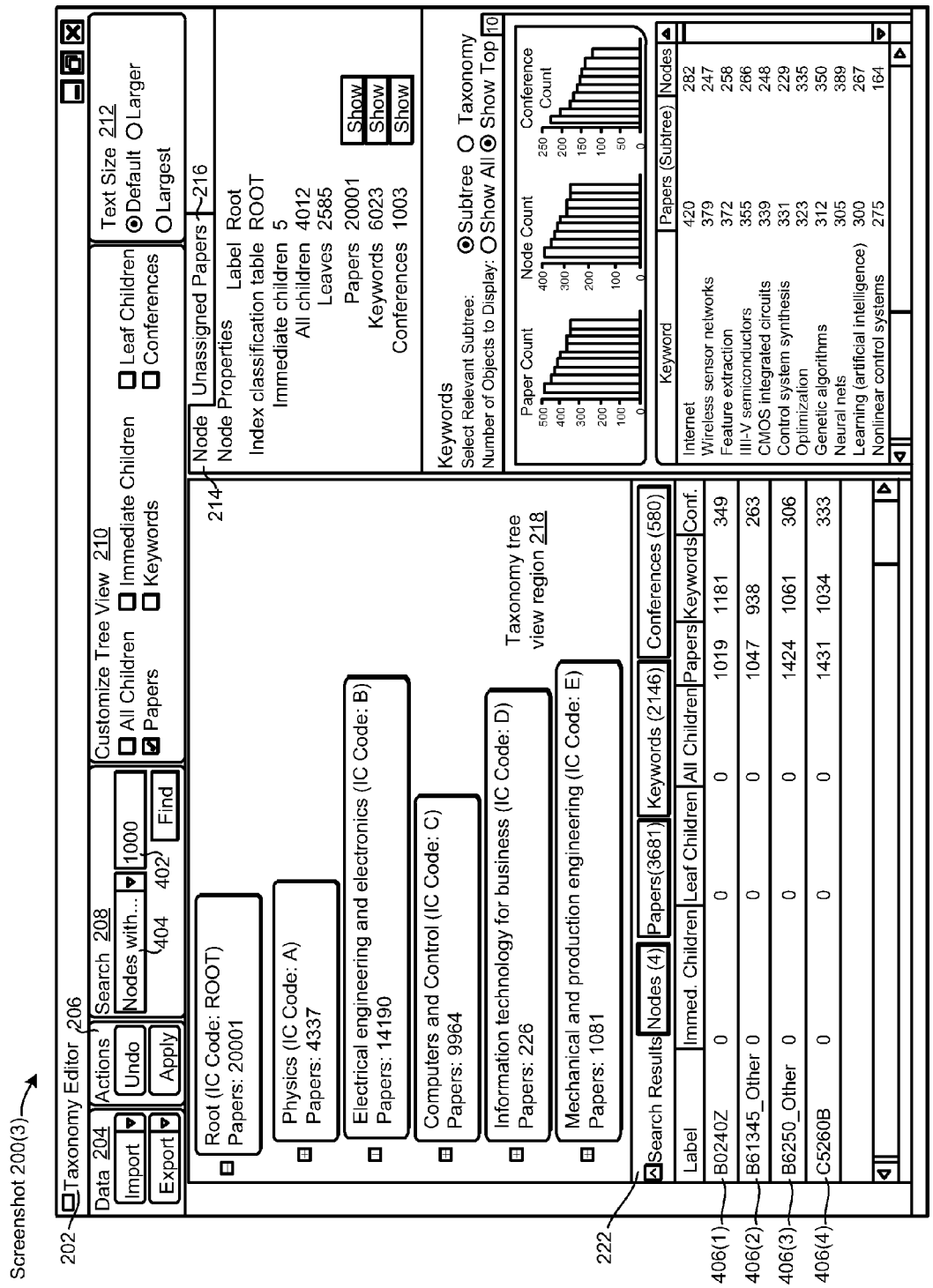

FIG. 4 shows a subsequent screenshot 200(3) where the user has utilized the search menu 208. In this case, the user has entered a search parameter of 1000 as indicated at 402 and a search condition of "paper count greater than" as indicated at 404. A "nodes" tab is selected in the search results menu 222. Rather than nodes that satisfy the search criteria, the user can alternatively select to view "papers" "keywords", or "conferences" from the search results menu 222 by clicking on the corresponding tab.

The search results for the user's search can be seen in the search results menu 222. In the screenshot, the search results are listed with a horizontal row 406(1)-406(4) dedicated to each node that satisfies the search criteria. The user can select an individual node (e.g. row 406(1)-406(4)) from the search results to see the node displayed on the tree view in the taxonomy tree view region 218. Assume for purposes of explanation that the user is interested in nodes that could be split to improve the taxonomy. In such a case, row 406(4) relating to node "C5260B" has the highest listed number of "1431". Assume further that the user selects row 406(4) of node "C5260B", such as by mouse clicking on the row.

Figure 5:
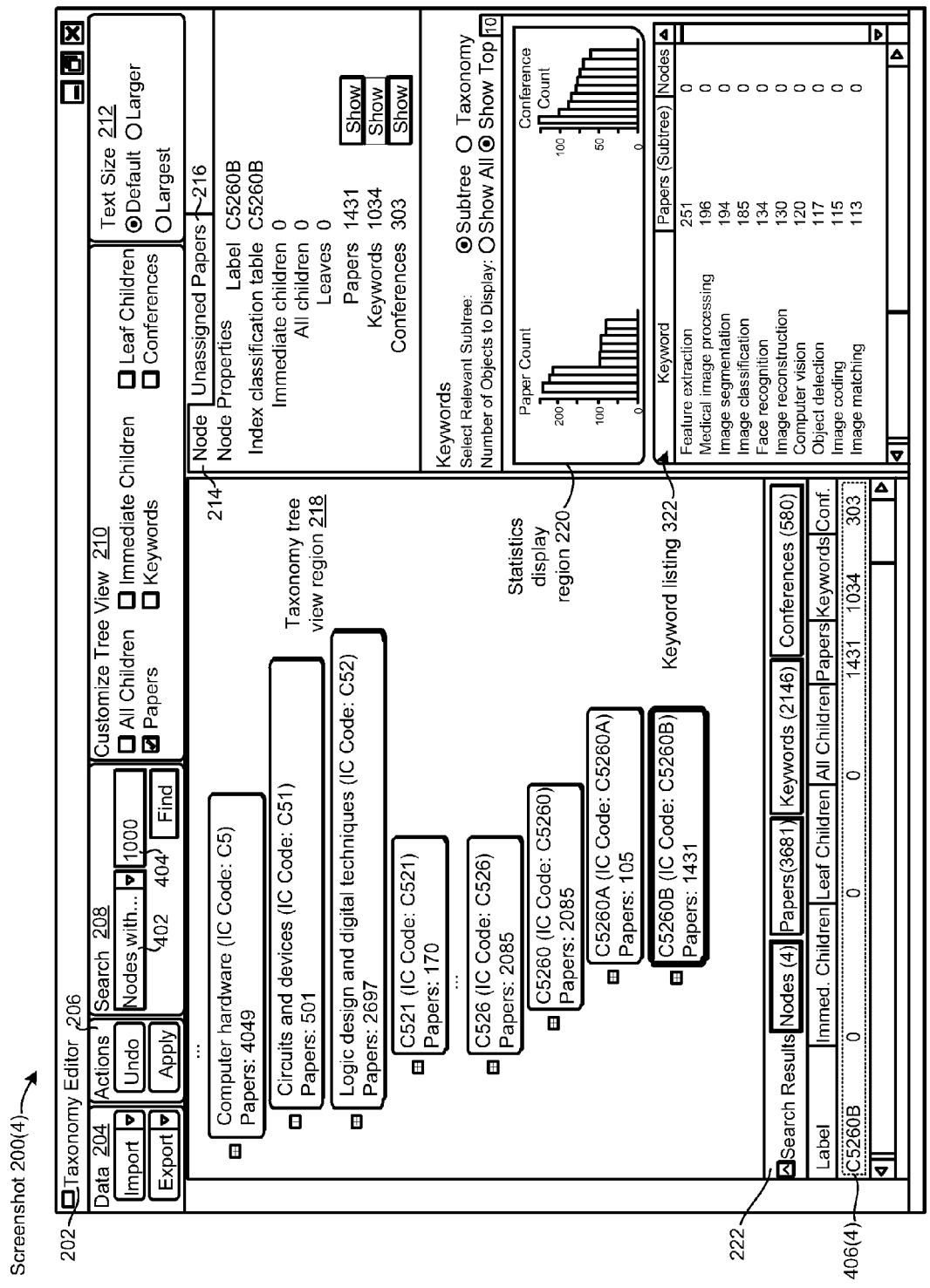

FIG. 5 shows another screenshot 200(4) generated responsively to the user selection of node "C5260B" mentioned above. Node "C5260B" is shown as selected by the user in search results menu 222 via the presence of a dotted line around the node. (Several regions of screenshot 200(4) are not shown in their entirety on screenshot 200(4) due to the space constraints of the drawing page). A portion of the taxonomy tree including node "C5260B" is presented in the taxonomy tree view region 218. This node is indicated as selected via the bolder lines of this node in the taxonomy tree region 218 relative to the other nodes. Node properties of node "C5260B" are detailed in the node menu 214. Assume further, that after reviewing the statistics of node "C5260B" the user decides to modify the node. The user can select the node for modification, such as by right-clicking on the node.

Figure 6:
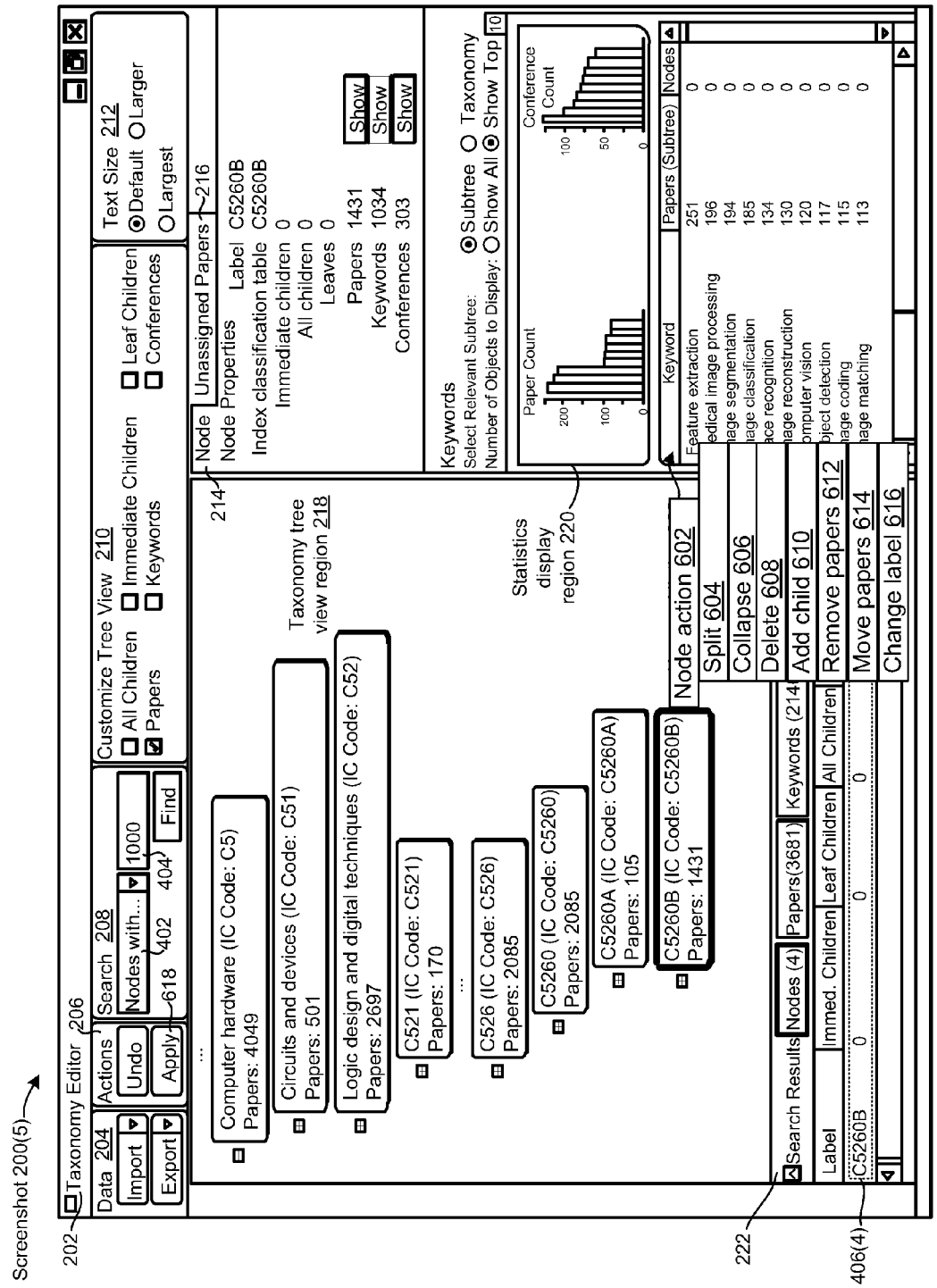

FIG. 6 shows another screenshot 200(5) generated responsively to the user selecting to modify node "C5260B" as described above relative to FIG. 5. Screenshot 200(5) includes a node action drop down menu 602. The node action drop down menu 602 includes several node modification options. In this instance, the node modification options include a split option 604, a collapse option 606, a delete option 608, an add child option 610, a remove papers option 612, a move papers option 614, and a change label option 616. In this case assume that the user decides that node "C5260B" includes too many (and/or dissimilar) papers, and/or a large number of papers, and therefore should be split.

The user can select the split option 604. Selection of the split option can cause a keyword listing (not shown) to be generated for the node. The keyword listing can list keywords that appear in one or more papers in the selected node (e.g., node "C5260B"). In some implementations, the key words can be presented in a ranked manner based upon number of occurrences (i.e., how many papers of the node include the keyword). The user can select an individual keyword to start a new group with the selected keyword or add the keyword to an existing group. Groups can then be presented in decreasing order of similarity to the keyword. If a new group is created, the keyword can be utilized as the default group label. Keywords can be presented in decreasing order of similarity to those of the group. The user can select one or more of these keywords to add to the group. Once the user is satisfied with the changes the user can apply changes to the taxonomy so that the group becomes a node. Alternatively, if the user has not completed the changes the user can save the changes utilizing the 'export' option of the data menu 204. The user can subsequently import the changes and make further changes. Once the user is satisfied, the user can apply the changes.

Applying changes can cause each group to be added to the taxonomy as a child node of the node being split. The group label can be utilized as the label for the child node. Keywords that are not added to an individual group can be added to an 'other' group. Papers of the original node can be partitioned between the child nodes based upon paper to child node similarity (i.e., based upon the overlap between keywords in the paper and keywords in child nodes).

In summary, the split option can use the similarity between keywords (i.e., overlap between papers that contain the keywords) present in various papers in the node to refine the node. In this case, the refinement includes adding child nodes and redistributing the papers between the child nodes by grouping similar keywords together. The user can create groups manually or use the bulk move to group keywords in an automated manner. Each group can be added as a child node of the node being split. Other keywords that are not part of any group can be coalesced into an 'Other group'. Subsequently, papers are partitioned between the child nodes based on paper to node similarity (overlap between keywords in paper and keywords in child nodes).

Similarly, the user can select the collapse option 606. This option can move child nodes recursively into the overlying node and makes the overlying node a leaf node. The taxonomy editor can offer information to the user to aid in selecting nodes to collapse. For instance, the user can search the node properties for nodes with relatively low paper counts. For instance, the user can select to have the nodes listed by increasing paper count. The user can select a node from the search results to view a trend line of the node. The user can then select the collapse option if applicable. For instance, a node that has relatively few papers and a decreasing trend line can show that the node not only is underutilized, but will be even more underutilized going forward. Such a node is a good candidate for collapsing.

The user can also utilize the delete option 608. Both leaf and non-leaf nodes can be deleted. In a case when a non-leaf node is deleted, the entire sub-tree rooted at this node can be deleted. Deleting a node may cause some papers to no longer be mapped to any remaining nodes in the taxonomy. In such a case, the papers are moved to the unassigned papers list.

The user can utilize the add child node option 610 to add a child node to a non-leaf node. The user can specify the label for the child node.

The remove papers option 612 can cause a listing of the node's papers to be generated. The user can select papers from the listing to be removed from the node for addition to the unassigned papers list.

The move papers option 614 allows the user to move papers between nodes. Upon selection of the move papers option 614, a listing of the node's papers can be generated along with another copy of the taxonomy tree. The user can select individual papers of the node and move them to a node of taxonomy tree. Similarly, papers can be selected from the unassigned papers menu 216 and dragged to a node listed in the taxonomy tree view region.

Likewise, papers can be moved in bulk between nodes. This bulk moving of papers leverages similarity between a paper and a node to help identify a more (and/or potentially most) similar node for each paper. This process can facilitate movement of the papers to such nodes in a very easy manner. Such automatic suggestions can be combined with the available manual controls in the application to help guide taxonomy modification in a very powerful manner.

Change label option 616 allows the user to change the label of the selected node. For instance, a technology may utilize alternative terms, but in time one of those terms may become dominant. The user may want to change the label to recite the dominant term.

Figure 7:
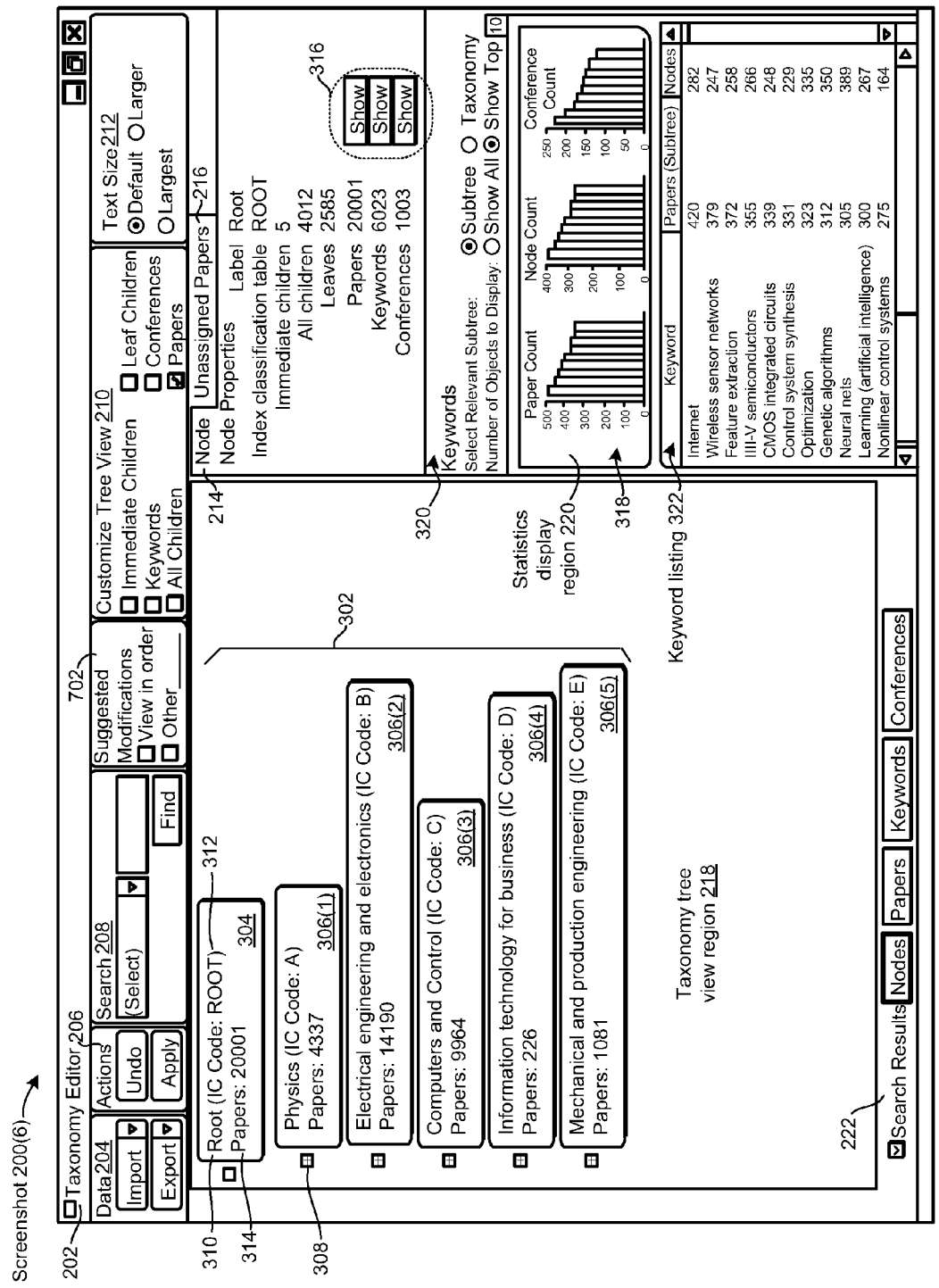

FIG. 7 shows another screenshot 200(6) that is similar to screenshot 200(2) described above relative to FIG. 3 with the addition of a suggested modifications menu 702. In this case, the taxonomy editor 202 performs additional processing of the taxonomy to suggest taxonomy modifications for the user. In this case, the processing can include analyzing the taxonomy based upon one or more parameters to identify portions of the taxonomy that can benefit from modification. The user can select to "view in order" the suggested modifications presented based upon potential benefit. Alternatively, the user can specify portions of the taxonomy of interest to the user for suggested modification. For purposes of explanation, assume that the user selects "view in order" from the suggested modifications menu 702. Assume further, that the taxonomy editor 202 evaluates the taxonomy based upon parameters such as paper count per node, conference count per node, trend lines, and similarity, among others.

Figure 8:
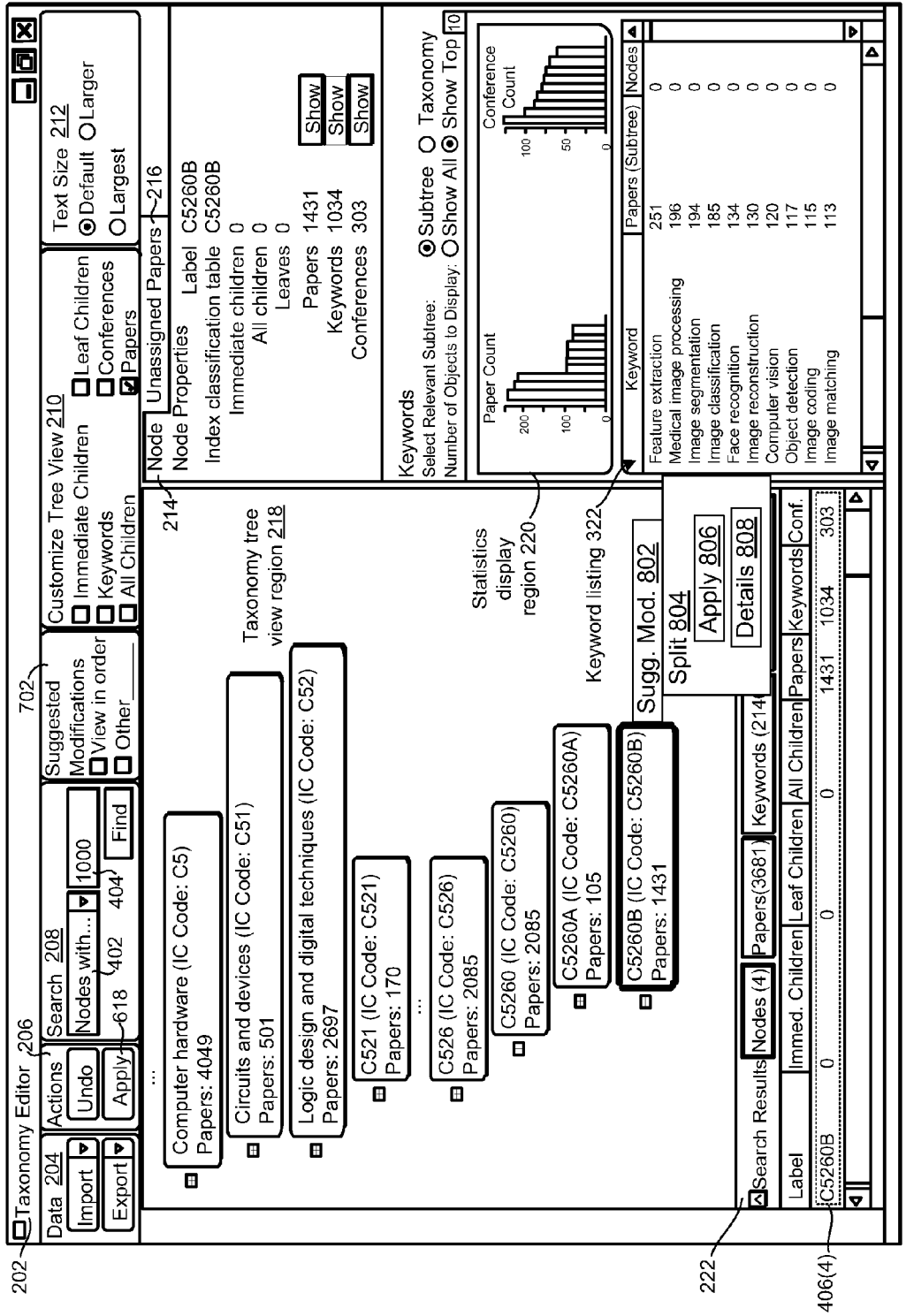

FIG. 8 shows another screenshot 200(7) generated responsive to the user's desire to have the taxonomy editor 202 suggest modifications to the taxonomy. Screenshot 200(7) is similar to screenshot 200(4) discussed above relative to FIG. 5. In this case, assume that the taxonomy editor 202 analyzes the taxonomy and identifies node "C5260B" as a node of the taxonomy that can benefit from modification. In this case, the taxonomy editor identifies node "C5260B" as a candidate for modification by highlighting the node and by associating a suggested modification 802 with the node. In this example, the suggested modification is to split the node as indicated at 804. The user can have the suggested modification automatically applied to node "C5260B" by selecting an "apply" option 806. If the user wants to view and/or change aspects of the modification, the user can select a "details" option 808. Responsive to the user selection, the taxonomy editor 202 can update the taxonomy represented in the taxonomy tree view region 218 to reflect the modification.

In the above example, a specific potential suggested modification 802 is shown with the node "C5260B" to which it relates. Alternatively, a listing of suggested modifications can be presented to the user. The user can then select a modification from the listing to have the associated node displayed. In some cases, this listing can be ranked, by one or more parameters, such as potential benefit to the taxonomy. For instance, the listing can be presented in a ranked manner with those potential suggested modifications that offer relatively high potential benefit to the organization of the taxonomy listed first.

To summarize, the taxonomy editor can present a graphical tree-based view or representation of the taxonomy. This view can allow users to browse and navigate through existing nodes in the taxonomy to gain an understanding of how the papers are distributed in the taxonomy. Further, at each node, several statistics can be provided (for example the number of papers, yearly trend lines of number of papers in the sub-tree below) to help the user identify the nodes in the taxonomy that may be good candidates for refinement or removal. Nodes with large number of papers and increasing trend line perhaps indicate an area that may benefit from modifying via splitting. On the other hand, nodes with few papers and with decreasing trends in the number of publications in recent years can possibly be collapsed with other nodes to simplify the overall taxonomy. The taxonomy editor can provide an integrated search mechanism that can help identify such nodes very quickly. Further, the user can use the search results to switch to browsing or search within a currently selected node while viewing to combine the benefits of search and navigational models.

Further, the taxonomy editor can provide the ability to modify the taxonomy interactively and with significant ease using the manual and bulk mode operations. The taxonomy editor can support various functionalities including (a) adding additional nodes to the taxonomy as child nodes, (b) deleting nodes from the taxonomy, (c) removing papers from a node, (d) manually assigning papers to a particular node, (e) and/or collapsing a sub-tree at various nodes, among others.

Additionally the taxonomy editor can provide automated operations like 'split' a node and 'bulk move papers' to a node(s) that leverages the current distribution of papers in the taxonomy and the keywords contained in the papers to 'suggest' such refinements.

Once the modifications have been made, the taxonomy editor can provide the user the ability to export the modified taxonomy to be made available for new publications and possibly apply it towards the existing papers.

Example Taxonomy Editing System

Figure 9:
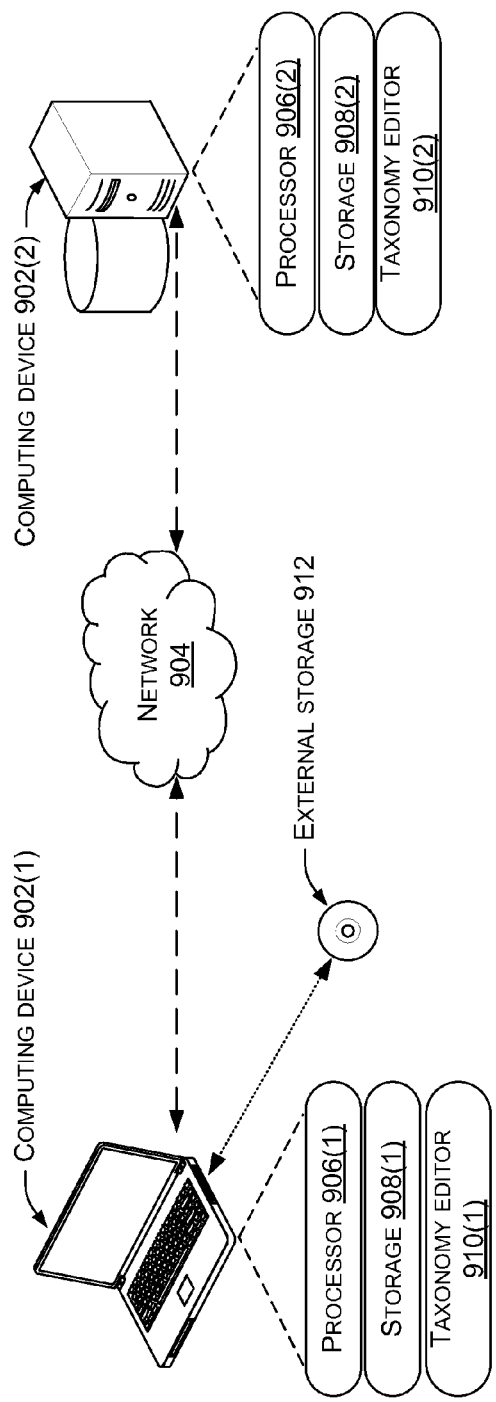
FIG. 9 shows an example of a taxonomy editing system in accordance with some implementations of the present concepts.

FIG. 9 shows a system 900 that is configured to accomplish the taxonomy editing concepts described above and below. In this case, system 900 includes first and second computing devices 902(1) and 902(2). The computing devices can exchange data over a network 904. Individual computing devices can function in a stand-alone or cooperative manner to achieve taxonomy editing.

In this case, each of computing devices 902(1) and 902(2) can include a processor 906, storage 908 and a taxonomy editor 910. Processor 906 can execute data in the form of computer-readable instructions to provide a functionality. Data, such as computer-readable instructions can be stored on storage 908. The storage can include any one or more of volatile or non-volatile memory, hard drives, optical storage devices (e.g., CDs, DVDs etc.), among others. The computing devices can also be configured to receive and/or generate data in the form of computer-readable instructions from an external storage mechanism 912. Examples of external storage mechanisms can include optical storage devices (e.g., CDs, DVDs etc.) and flash storage devices (e.g., memory sticks or memory cards), among others. The computing devices may also receive data in the form of computer-readable instructions over network 904 that is then stored on the computing device for execution by its processor.

Taxonomy editor 910 can receive a taxonomy and associated data (e.g., scientific papers) and enable a user to view and/or improve the taxonomy. Examples of screenshots that can be generated by taxonomy editor 910 are described above relative to FIGS. 2-8. Alternatively, the taxonomy editor can receive scientific papers and generate a taxonomy for those papers. The taxonomy editor 910 can present the taxonomy to the user for viewing, approval, and/or modification. In some implementations, the taxonomy editor can evaluate the taxonomy and the scientific papers associated with the taxonomy and suggest changes to the taxonomy to the user.

As mentioned above, either of computing devices 902(1) and 902(2) can function in a stand-alone configuration. For instance, a taxonomy and associated data (i.e., scientific papers) could exist on computing device 902(1) (and/or external storage mechanism 912). In such a case, taxonomy editor 910(1) can provide the taxonomy editing functionality without communicating with network 904 and/or computing device 902(2). In such a case, a user of computing device 902(1) can edit the taxonomy as desired without regard to network availability.

In another scenario, the taxonomy and the taxonomy editor could exist on computing device 902(1) while the associated data (i.e., scientific papers) existed on computing device 902(2). In such a case, communication between the computing devices can allow a user of computing device 902(1) to achieve taxonomy editing as desired.

In still another scenario computing device 902(1) can be a thin computing device with limited storage and/or processing resources. In such a case, processing and/or data storage can occur on computing device 902(2) (and/or upon a cloud of unknown computers connected to network 904). Results of the processing can then be sent to and displayed upon computing device 902(1) for the user.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices.

Example Taxonomy Editor

Figure 10:
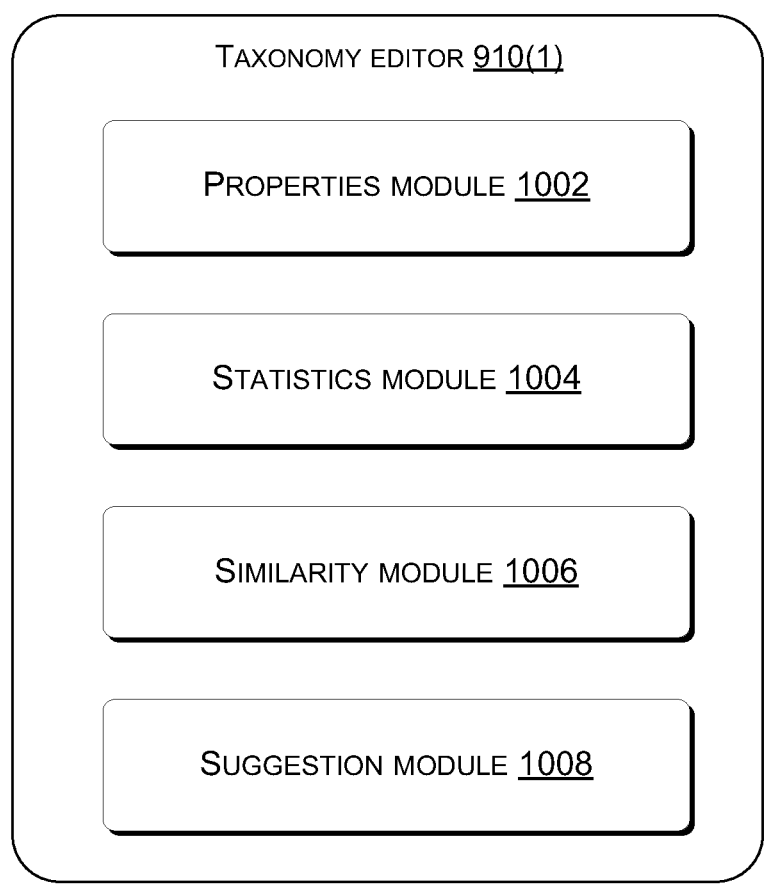
FIG. 10 shows a taxonomy editor of FIG. 9 in more detail in accordance with some implementations of the present concepts.

FIG. 10 describes modules that can be employed by taxonomy editor 910(1) in one implementation. In this case, the taxonomy editor can include a properties module 1002, a statistics module 1004, a similarity module 1006, and a suggestion module 1008.

The properties module 1002 can identify properties of the data associated with a taxonomy. For instance, the properties can relate to the scientific papers contained in the data. Examples of such properties are described above relative to FIGS. 2-3. The properties module can then cause the properties and/or scientific papers to be populated with the taxonomy, such as in a screenshot. For instance, the properties module can cause identified properties of a node to be displayed in a node properties region (see FIGS. 2-8).

Statistics module 1004 can calculate trend lines for keywords, nodes, etc. over time. The statistics module can process the papers (i.e., content of the papers), metadata associated with the papers, and/or other data, such as external data to calculate the statistics.

Similarity module 1006 can evaluate the similarity of keywords relative to papers within a given node of the taxonomy and/or between nodes of the taxonomy, and also of scientific papers that are not assigned to a node. The similarity module can utilize a similarity function that employs a similarity threshold. In some cases, an example similarity function between a paper and a node defines similarity to be a ratio of the number of distinct keywords that are present in both the paper and the node to the total number of distinct keywords present in either the paper or the node (where the keywords in a node are defined to the set of all keywords over all papers that appear in the node). An example similarity function between a pair of nodes can be defined as the ratio of the number of distinct keywords that are present in both nodes to the total number of distinct keywords present in either of the nodes. An example similarity function between a pair of keywords can be defined as the ratio of the number of distinct papers that contain both keywords to the total number of distinct papers that contain either of the keywords.

Suggestion module 1008 can utilize information from the properties module 1002, statistics module 1004, and similarity module 1006, among others to determine potential modifications to the taxonomy. The potential modifications can then be presented to the user.

In this example, a single taxonomy editor 910(1) contains the properties module 1002, statistics module 1004, similarity module 1006, and suggestion module 1008. However, these modules can be distributed in other implementations. For instance, the properties module 1002, statistics module 1004, and similarity module 1006 could occur on a first computing device and relay information to a second computing device upon which the suggestion module 1008 occurs. Output of the properties module 1002, statistics module 1004, similarity module 1006 and the suggestion module 1008 can then be presented on the second (and/or another) computing device.

Exemplary Methods

Figure 11:
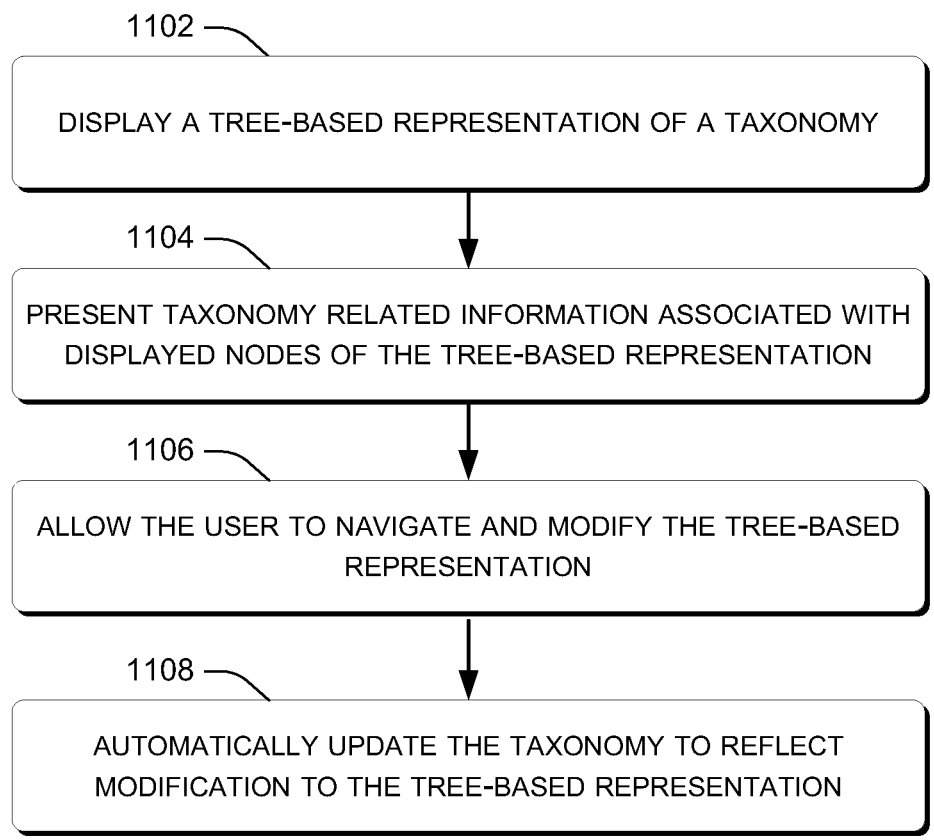
FIG. 11 shows an example of a taxonomy editing method in accordance with some implementations of the present concepts.

FIG. 11 illustrates a flowchart of a process, technique, or method 1100 that is consistent with at least some implementations of the present taxonomy editing concepts.

Block 1102, displays a tree-based representation of a taxonomy. The display may include the entire representation or a portion of the representation.

Block 1104 presents taxonomy-related information associated with displayed nodes of the tree-based representation. The taxonomy-related information can relate to properties, statistics, and/or keywords, among others, relative to the displayed nodes.

Block 1106 allows the user to navigate and modify the tree-based representation. For instance, the user can navigate through the tree-based representation to identify a node of interest. The user can then evaluate the taxonomy-related information associated with the node of interest to determine whether to modify the node. The user can then select to modify the node as desired, such as by collapsing the node, deleting the node, creating a child node, splitting the node, etc.

Block 1108 automatically updates the taxonomy to reflect modification to the tree-based representation. Stated another way, once the user is satisfied with the changes to the tree-based representation, the changes can be applied to the taxonomy.

To summarize, at least some of the present methods can leverage an existing distribution of scientific papers, if available within the existing taxonomy and can provide various operations like split (for refinement), collapse (for simplification), move papers individually or in bulk to help guide the refinement using automatic suggestions and/or manual controls.

The methods can also offer interactive viewing and modification of a taxonomy through a combination of manual and automated techniques. Toward this end some methods can determine keyword similarity of the taxonomy or portions thereof. The keyword similarity can be leveraged automatically and/or by the user for taxonomy refinement (suggestions and automation during split), and paper to node similarity to (re)assign papers to nodes (bulk move of papers to nodes).

Finally, some of the methods can allow the user to collapse at any taxonomic level, not just the local level. Thus, the user can essentially create a new taxonomy based upon the levels and keywords desired by the user. Some implementations can automatically suggest modification for the user while others provide information so that the user can make manual modifications.

The order in which the method 1100 is described is not intended to be construed as a limitation, and any number of the described blocks or acts can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device causes the method to be performed.

Conclusions

Although techniques, methods, devices, systems, etc., pertaining to taxonomy editing of scientific papers are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a processor; and
a taxonomy editor configured to execute on the processor to generate a visual representation of a taxonomy associated with a set of scientific papers, the taxonomy editor comprising:
a properties module configured to identify one or more properties relating to an individual node of the taxonomy, the one or more properties reflecting a number of scientific papers assigned to the individual node in recent years;
a statistics module configured to determine a trend relating to the number of scientific papers assigned to the individual node in recent years; and
a suggestion module configured to utilize the one or more properties and the trend to, in at least one instance when the individual node is not a leaf node and the trend indicates that the number of scientific papers assigned to the individual node in recent years is decreasing, provide a suggested modification to a user to collapse at least two children leaf nodes of the individual node into the individual node and cause the individual node to become a leaf node of the taxonomy.

2. The system of claim 1, wherein the properties module is further configured to populate a node properties region of the visual representation with the one or more properties.

3. The system of claim 1, wherein the statistics module is further configured to populate a statistics display region of the visual representation with a graphical representation of the trend indicating that the number of scientific papers assigned to the individual node in recent years is decreasing.

4. The system of claim 1, wherein the taxonomy editor is further configured to:
receive a user selection indicating the user selects the suggested modification; and
responsive to receiving the user selection, automatically modify the taxonomy to collapse the at least two children leaf nodes into the individual node.

5. The system of claim 1, wherein the suggestion module is configured to provide the suggested modification to collapse the at least two children leaf nodes into the individual node when the individual node is associated with relatively few scientific papers.

6. The system of claim 1, wherein the taxonomy editor is further configured to present the suggested modification on the visual representation with the individual node along with associated node properties and node statistics of the individual node.

7. The system of claim 1, wherein the taxonomy editor is further configured to allow the user to browse, search and navigate the visual representation.

8. The system of claim 1, wherein the taxonomy editor is further configured to allow other modifications of the individual node by deleting the individual node, splitting the individual node or creating a child node of the individual node in the visual representation and wherein the taxonomy editor is further configured to apply the other modifications to the taxonomy.

9. A computer-readable storage device having instructions stored thereon that when executed by a computing device cause the computing device to perform acts, the acts comprising:

providing a navigable visual representation of a taxonomy, the navigable visual representation reflecting a plurality of nodes of the taxonomy that have associated publications;

generating statistics associated with an individual node of the taxonomy, the statistics reflecting a trend in a number of the publications associated with the individual node in recent years; and facilitating user modification of the taxonomy, the facilitating comprising:
- determining that the trend indicates that the number of publications associated with the individual node in recent years is increasing; and
- responsive to determining that the trend indicates that the number of publications associated with the individual node in recent years is increasing, providing, to a user, a suggested modification to split the individual node by adding at least two nodes to the taxonomy as children of the individual node.

10. The computer-readable storage device of claim 9, wherein the providing and the generating comprise displaying the navigable visual representation of the taxonomy and the statistics on a single graphical window, and wherein in another instance where the user selects a portion of the taxonomy on the navigable visual representation, the displayed statistics are updated to relate to the selected portion.

11. The computer-readable storage device of claim 9, wherein the providing comprises displaying the navigable visual representation and the generating comprises displaying the statistics.

12. The computer-readable storage device of claim 9, wherein the providing comprises displaying the navigable visual representation of the taxonomy as a tree of the plurality of nodes.

13. The computer-readable storage device of claim 9, wherein the facilitating comprises offering a plurality of modification options to the user relative to the individual node.

14. The computer-readable storage device of claim 9, wherein the facilitating comprises providing the suggested modification to the user by displaying the suggested modification to the user in the navigable visual representation.

15. The computer-readable storage device of claim 14, wherein the displaying comprises displaying a plurality of potential modifications in a ranked manner.

16. The computer-readable storage device of claim 14, the acts further comprising:
- determining that there are a relatively large number of publications associated with the individual node, wherein the suggested modification to split the individual node is provided responsive to both:
- the determining that the trend indicates that the number of publications associated with the individual node in recent years is increasing, and
- the determining that there are a relatively large number of publications associated with the individual node.

17. The computer-readable storage device of claim 9, embodied as at least one of a non-volatile memory, a volatile memory, a hard drive, an optical storage device, or a flash storage device.

18. A method comprising:

providing a navigable visual representation of a taxonomy, the navigable visual representation reflecting a plurality of nodes of the taxonomy that have associated publications;

generating statistics associated with an individual node of the taxonomy, wherein the statistics reflect a recent trend in a number of publications that are associated with the individual node; and facilitating user modification of the taxonomy, the facilitating comprising:
- determining that the recent trend is an increasing trend that indicates that the number of publications that are associated with the individual node is increasing,
- determining that there are a relatively large number of publications associated with the individual node, and
- responsive to determining that the trend is an increasing trend and that there are a relatively large number of publications associated with the individual node, displaying, on the navigable visual representation, a suggested modification to split the individual node by adding at least two nodes to the taxonomy as children of the individual node, wherein at least the facilitating is performed by a computing device.

19. The method of claim 18, wherein the publications comprise scientific papers.

20. The method of claim 18, further comprising:
splitting the individual node into the at least two nodes; and
partitioning individual publications that are associated with the individual node among the at least two nodes that are added to the taxonomy.

21. The method of claim 20, wherein the partitioning is based upon overlap between keywords of the at least two nodes and the individual publications.

* * * * *